Patented Feb. 2, 1943

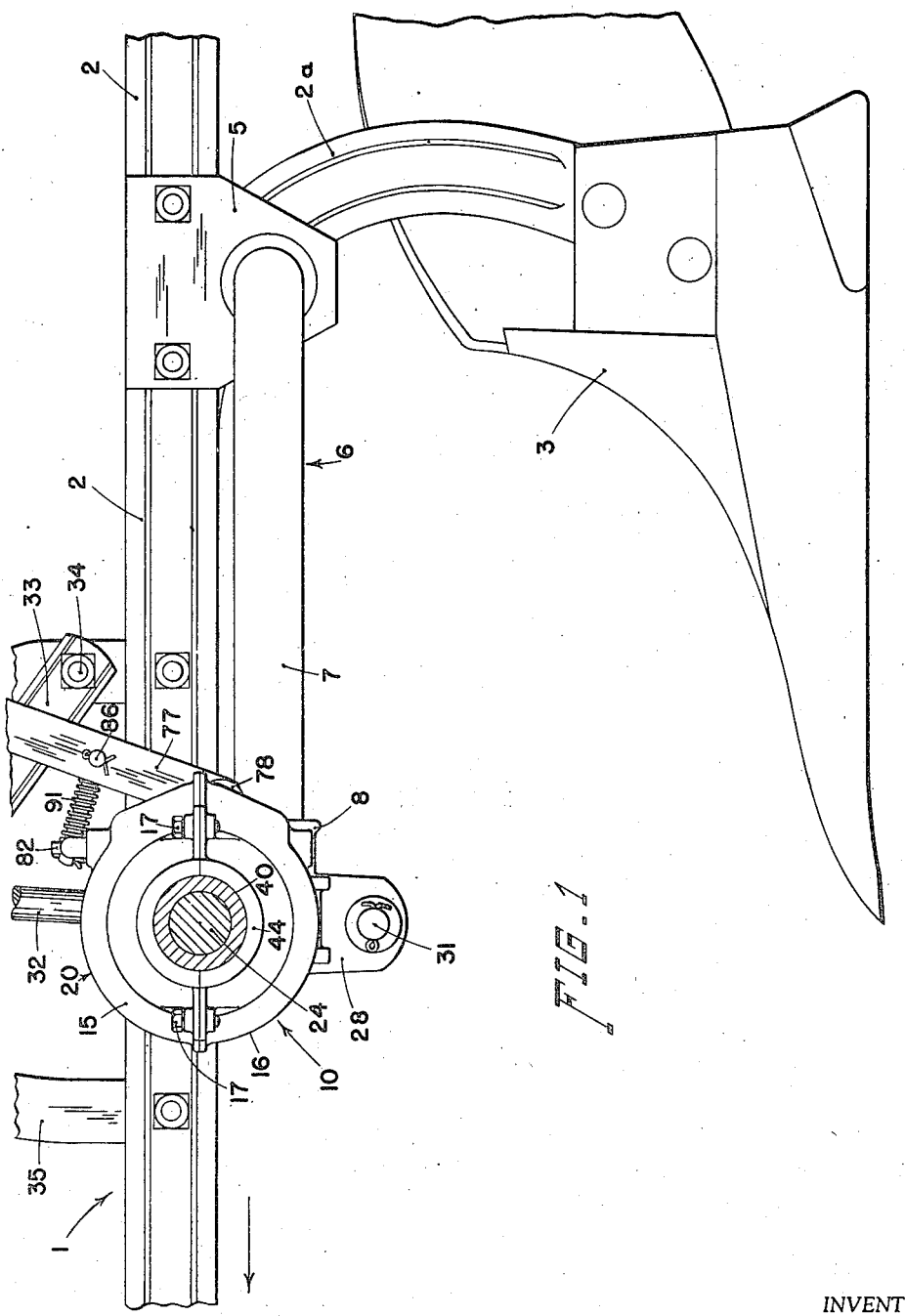

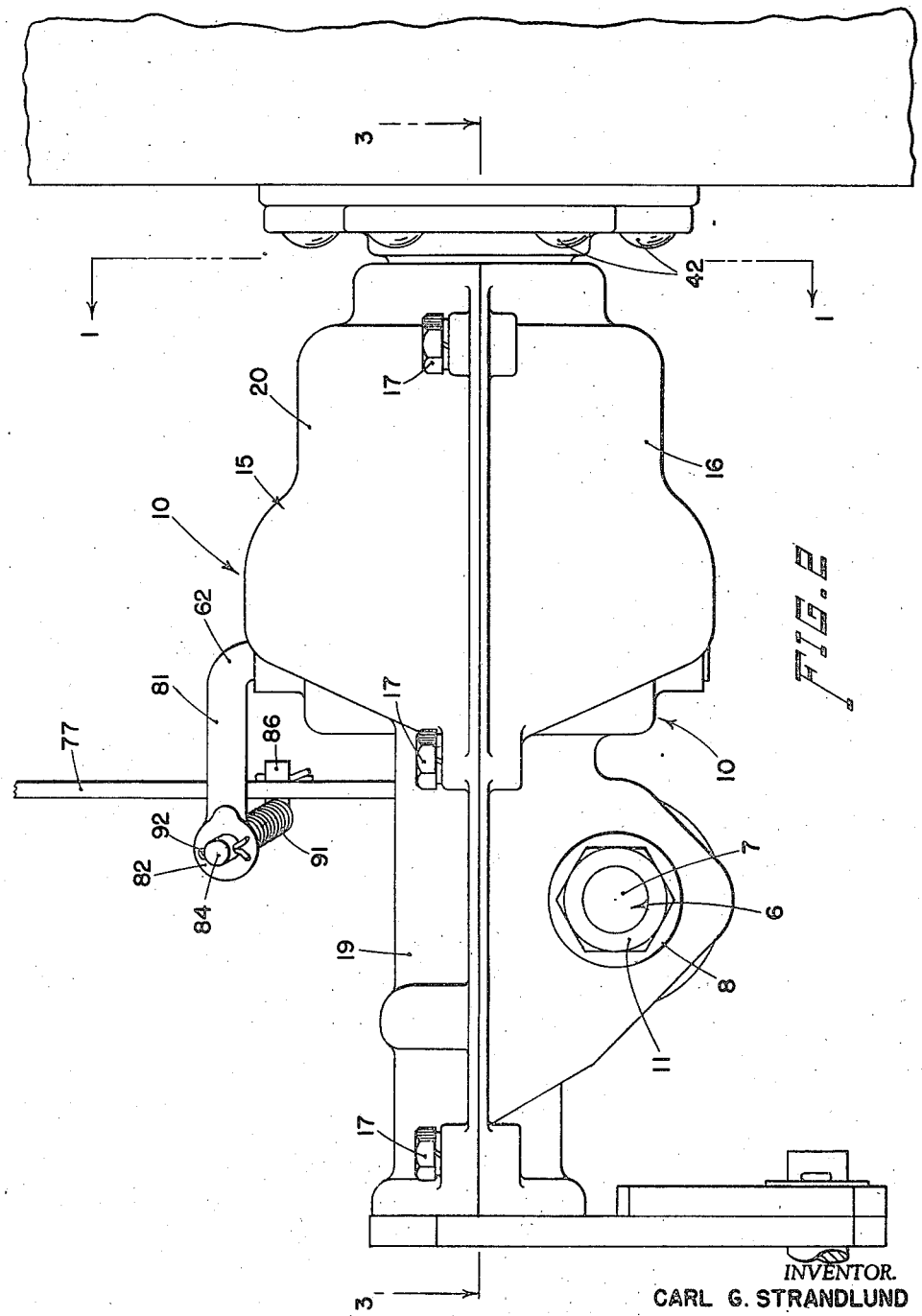

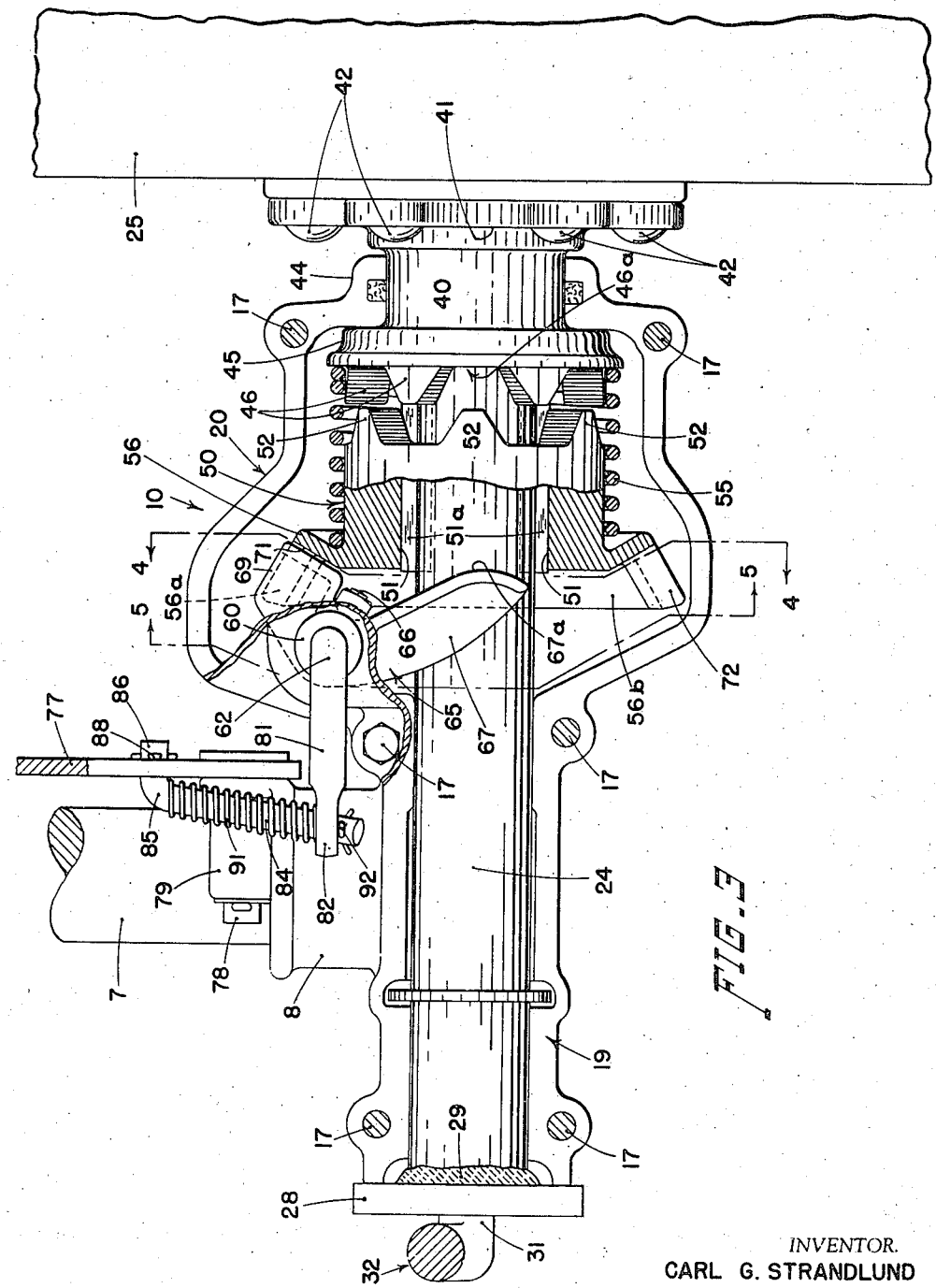

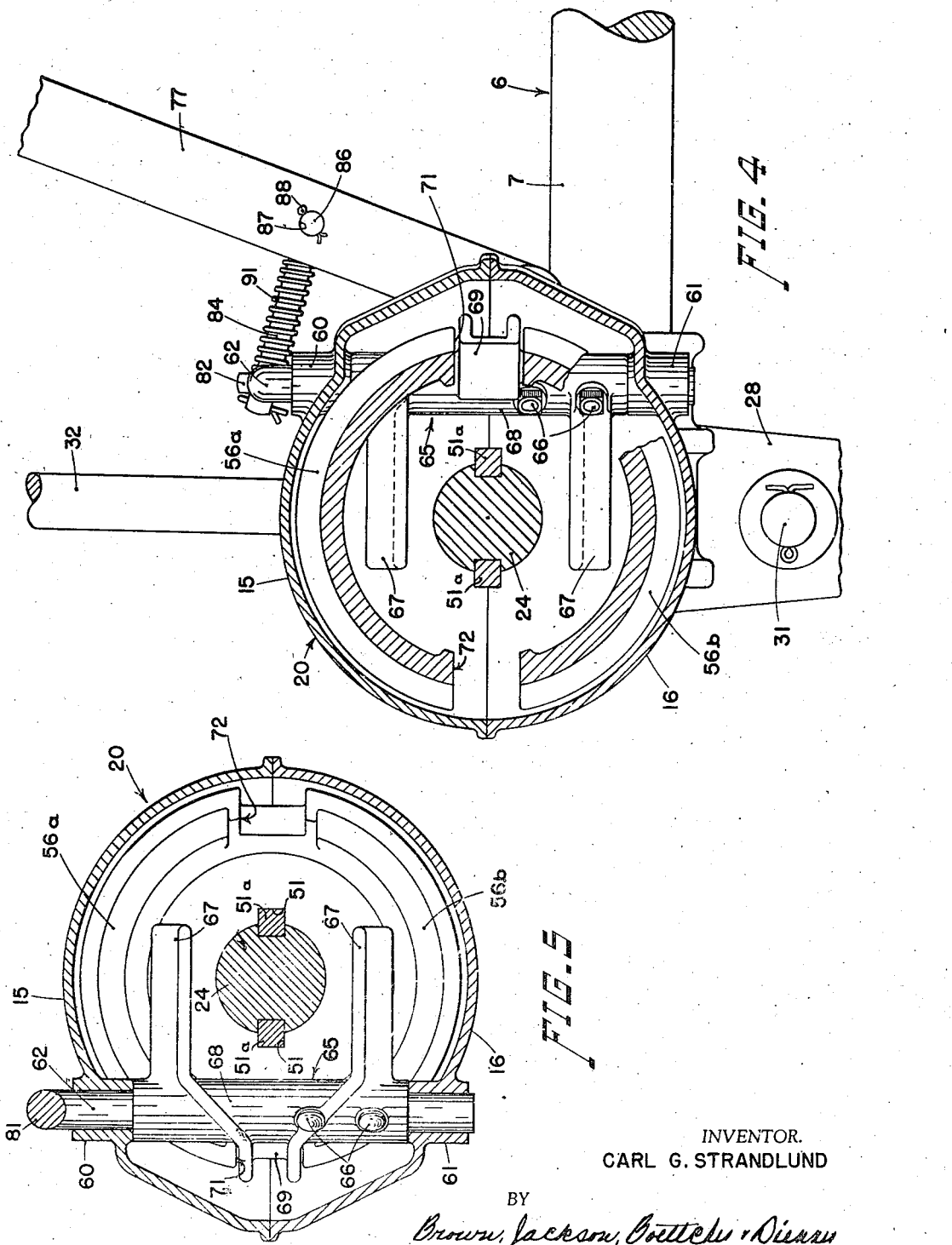

2,309,995

UNITED STATES PATENT OFFICE 2,309,995

SELF-INTERRUPTING CLUTCH

Carl G. Strandlund, Moline, Ill., assignor to Deere & Company, Moline, Ill., a corporation of Illinois Application November 26, 1938, Serial No. 242,449

29 Claims. (Cl. 192—62)

The present invention relates generally to self interrupting clutches for agricultural implements and the like, and is more particularly concerned with a new and improved self-interrupting clutch for use on plows and other implements in which a part or parts are to be raised and lowered.

Heretofore, plows and like agricultural implements having parts, such as the frame, operating tools, and the like, to be raised and lowered, have in many instances been provided with a crank axle mounted for rocking movement on the frame and having an outer end carrying a supporting wheel, the latter being associated with a self-interrupting clutch of the half revolution type through the actuation of which a crank arm is connected to exert a thrust upwardly through a link against the frame of the part to be raised. In such arrangements, the part to be raised is elevated by power derived from the rotation of the wheel, but when the part is to be lowered, the clutch is released and lowering takes place by gravity without any resistance to the rapid downward movement of the part, thereby allowing the latter to drop heavily upon the ground. In the case of plows, this has been known to damage the points of the plow shares when they fall upon a rock or hard ground, and the same is true of other types of implements. Further, conventional clutches are usually arranged to raise only when the implement moves forwardly. It may occur that an implement with the tool or other part in lowered position strikes an immovable object, with the result that the implement can no longer be moved forwardly but can be moved only rearwardly. In that case, the conventional power lift clutch is no longer effective to raise the part by power and a great deal of labor is required to dig the tool out of the ground to free the implement. Further, power lift clutches of the half revolution type are limited to a cycle that includes only a half revolution. This is so because the conventional clutch locks in only one direction so that it is necessary to swing the operating crank through a half revolution in order to set up an over center lock and hold the parts in raised or other position.

Having the above disadvantages in mind, the object and general nature of this invention is the provision of a self interrupting clutch for agricultural implements and the like in which the tools or other parts can be raised by power derived from the ground wheel whether the implement moves forwardly or rearwardly, and in which the clutch raises and lowers the implement at substantially the same speed without any racing ahead when the implement is lowered, as in conventional clutches. A further feature of this invention is the provision of a more rugged and compact clutch, having fewer parts which are well adapted for enclosing in a dirt-proof oil-retaining housing, and which provides greater clearance above the ground than conventional clutches in use at the present time. An additional feature of the present invention is the provision of a self interrupting clutch in which the clutch teeth engage more positively than the clutch roller in the conventional clutch, and in which the efficiency is not impaired by wear of the parts nearly as much as in a conventional clutch.

Still further, another important feature of this invention is the provision of a self interrupting clutch of the positive engagement type in which the driven part is held in any available position against movement therefrom in either direction, and it is also a feature of this invention to provide means whereby the clutch is automatically disengaged if it is operated in a manner to temporarily engage the clutch teeth before the driven part is fully released for movement.

These and other objects and advantages of my invention will be apparent to those skilled in the art after a consideration of the following detailed description, taken in conjunction with the accompanying drawings illustrating the preferred form of this invention.

In the drawings:

Figure 1 is a side elevation of a plow in which the present invention is incorporated, the ground wheel being removed and the driven shaft and driving clutch sleeve being cut along the line 1—1 of Figure 2;

Figure 2 is a front elevation of a portion of the plow shown in Figure 1;

Figure 3 is a plan view of the portion of the plow shown in Figure 2, with the upper half of the clutch housing removed or broken away in order to show the details of the clutch;

Figure 4 is a section taken along the line 4—4 of Figure 3; and

Figure 5 is a section taken along the line 5—5 of Figure 3.

Referring now to the drawings, more particularly Figures 1, 2 and 3, it will be seen that for the purpose of illustrating the principles of the present invention I have shown a plow, indicated in its entirety by the reference numeral 1, having a plurality of plow beams 2, the right hand beam shown in Figure 1 being bent downwardly, as at 2a, to form a shank to which the plow bottom 3 is fixed. The near beam 2 carries a downwardly disposed bracket 5 in which the journal portion of a crank axle is mounted for rocking movement, the crank portion of the axle 6 extending forwardly, as at 7, when the plow bottoms 3 are lowered, as indicated in Figure 1. The forward end of the crank axle 6 is received in any suitable manner in the socket portion 8 of a clutch housing indicated in its entirety by the reference numeral 10 (Figures 2 and 3). The forward end of the crank portion 7 of the crank axle 6 is fixed securely to the clutch housing 10 by a nut 11 or other suitable means, the forward end of the axle portion 7 being threaded to receive the nut 11. Thus, the casing 10 is firmly locked to the crank axle 6 and held against any rocking movement about the axis of the crank portion 7.

The housing 10 consists of two parts, 15 and 16, (Figure 2), the two halves being secured together by bolts 17 and constructed to form a journal section 19 and an enlarged clutch casing 20.

Rotatably mounted within the journal section 19 is a shaft 24 that serves as an axle upon which a ground wheel 25 is mounted for rotation. At the end of the shaft 24, opposite the wheel 25, a crank 28 is fixed, as by welding 29 or the like. The outer end of the crank 28 is apertured to receive the lower inturned end 31 of a depth adjusting link 32. The upper end of the link 32 is pivoted in any suitable manner to an adjusting lever 33 (Figure 1) which is, in turn, pivoted, as at 34, to a sector 35 carried by the near plow beam 2. The sector has the usual notches receiving the cooperating detent mechanism (not shown) carried by the lever 33. From the structure so far described, it will be seen that if the shaft 24 (Figure 1) be rotated through a half revolution in either direction from the position shown, the lower or outer end of the crank arm 28 will exert an upward thrust through the link 32 against the lever 33, and if the latter is locked, as it normally is, through the sector 35, the forwardly extending crank portion 7 of the crank axle 6 will be swung downwardly in a counterclockwise direction, thereby reacting against the ground wheel 25 (Figure 2) to raise the plow beams 2 and plow bottoms 3 out of the ground.

The clutch mechanism controlling the rotation of the shaft 24, and which forms the principal feature of the present invention, will now be described.

As mentioned above, the shaft 24 is journaled within the housing 10 and, at one end, carries the crank 28, and at the other end receives the ground wheel 25. According to the present invention, a driving clutch sleeve 40 is disposed about the outer end of the shaft 24 and has a flanged section 41 which is riveted, as at 42, or otherwise secured to the wheel 25. The driving clutch sleeve 40 is journaled for rotation in a bearing section 44 at the outer end of the housing 10, and the inner portion of the sleeve 40 is flanged, as at 45, and is disposed within the clutch casing section 20 of the housing 10. The flanged portion 45 of the sleeve 40 is provided with a plurality of inclined axially inwardly facing clutch teeth 46, the latter being disposed radially inwardly of the radially outer portions of the flange 45 and separated by spaces 46a which will be referred to later. The flange 45 also cooperates with the inner wall at the outer end of the housing 10 to provide a thrust bearing to prevent the wheel and sleeve 40 from sliding outwardly on the shaft or axle 44.

A driven clutch sleeve, indicated in its entirety by the reference numeral 50 in Figure 3, is mounted for sliding movement about the shaft 24 and is provided with a pair of keyways 51 in which keys 51a similarly mounted on the shaft 24 are received. Thus, the driven clutch sleeve 50 rotates with but is slidable on the shaft 24. The outer end of the slidable clutch sleeve 50 is provided with clutch teeth 52 corresponding in form and spacing to the teeth 46 at the inner end of the driving clutch sleeve 40. The clutch teeth 52 face generally axially inwardly relative to the companion teeth 46 and, similar to the latter, are disposed radially inwardly of a flange 56 that is formed on the inner end of the sleeve 50. It will be noted that both sets of teeth 46 and 52 have inclined surfaces so that force exerted between them tends to separate the clutch members by sliding the driven clutch sleeve away from the driving clutch sleeve. Normally the clutch members 40 and 50 are held out of engagement by means of a coil spring 55, the outer end of which reacts against the flange 45 of the sleeve 40 to shift the other clutch sleeve toward the left, as viewed in Figure 3, and out of engagement with the driving clutch teeth 46. The flange 56 serves not only to receive the inner end of the spring 55 but also cooperates with suitable control means presently to be described. When the implement is in operation, the wheel 25 rotates in its journal support relative to the driven parts 24 and 50, and hence it may be desirable to provide suitable anti-friction bearings between the ends of the spring 55 and the flanges 45 and 56, although for purposes of clarity I have not shown such bearings in Figure 3.

Suitable control mechanism is provided for shifting the driven clutch sleeve 50 into driving engagement with the driving clutch sleeve 40 so as to impart rotation to the shaft 24 and the crank 28 from the ground wheel 25, such rotation continuing through the desired part of a revolution, and then the clutch is automatically disengaged. The control mechanism will now be described.

Upper and lower bosses 60 and 61 (Figures 4 and 5) are formed in the casing halves 15 and 16 and serve as journals to receive a rock shaft 62. A sleeve casting 65 is bolted, as at 66, to the control shaft 62 and is provided with a pair of spaced apart arms 67 formed integral with the sleeve section 68, the latter having a central arm 69, preferably but not necessarily also formed integrally with the sleeve section 68.

The flanged portion 56 of the driven clutch sleeve 50 is extended in general conical formation, as at 56a and 56b, forming two halves separated by openings 71 and 72 (Figures 4 and 5). The walls of the openings 71 and 72 are spaced apart slightly greater than the corresponding dimension of the arm 69 and form spaced apart stops which are engaged by the arm 69 so that the latter limits the rotation of the sleeve 50 in either direction when the arm drops into either of the openings, being the position shown in Figures 3 and 4.

The rocking movement of the shaft 62 is controlled by means of a manually operated lever 77, the lower end of which is mounted on a pivot pin 78 which is secured in a bearing section 79 (Figure 3) which is integral with the socket 8. The outer end of the shaft 62 is bent to form a crank 81, and the outer end of the latter is flattened and apertured, as at 82, to receive the outer end of a rod 84. The inner end 85 of the latter is bent laterally, as at 86, and is disposed in an opening 87 in the control lever 77. A cotter key 88 holds the rod 84 connected to the lever 77. A coil spring 91 is disposed about the rod 84 and bears against one side of the end 82 of the crank 81. A cotter key 92 prevents the spring 91 from forcing the end 82 off of the rod 84.

The operation of the self-interrupting clutch construction described above is substantially as follows:

Normally, the driven clutch sleeve is held against rotation in either direction by the engagement of the arm 69 in one or the other of the slots 71 or 72, and this, of course, locks the shaft 24 and crank 28 against movement, therefore acting through the link 32 to hold the crank axle 6 in the desired position. In the drawings, particularly Figure 1, the parts are shown with the plow bottoms 3 held in lowered or working position. The spring 55 acts to hold the clutch members 40 and 50 in separated relation, and, at the same time, forces the driven member 50 to the left, as viewed in Figure 3, positively retaining the arm 69 in sleeve locking position by virtue of the pressure of the sleeve 50 against the rounded ends 67a of the arms 67. When it is desired, for example, to raise the plow beams 2 and plow bottoms 3 into transport position, the operator exerts a pull on the trip lever 77, which may be done through the instrumentality of a rope or the like extending from the lever 77 to the operator's position on the implement or on the tractor, and this exerts a thrust through the yielding spring 91 against the outer end of the crank 81 of the rock shaft 62 and rocks the latter, causing the rounded ends 67a of the arms 67 to bear against the inner end of the shiftable clutch sleeve 50 and shift the same against the pressure of the spring 55 until the teeth 52 mesh with the teeth 46 on the driving clutch sleeve 40.

At the same time that the rocking of the shaft 62 swings the member 65 to engage the clutch sleeves, the arm 69 is simultaneously withdrawn from between the walls of the notch. As soon as the arm 69 is disengaged from the driven member 50, the latter is free to rotate with the wheel 25 and driving clutch member 40, and when the driven clutch member 50 begins to rotate, the adjacent portion of the flange 56a is carried behind the arm 69, thereby causing the straddle arms 67 to hold the driven clutch member 50 positively in engagement with the driving clutch sleeve 40. Hence, the operator can release his hold on the trip lever 77 and the clutch mechanism will continue to drive the shaft 24 and crank 28 from the ground wheel 25. This motion of the latter exerts a thrust through the link 32 against the depth adjusting lever 33 (Figure 1), and since the latter is normally latched to the sector 35, it will be seen that the rotation of the wheel 25 acts to swing the crank section 7 of the crank axle 6 in a downward or counter-clockwise direction, as viewed in Figure 1, thus raising the beams 2 and the plow bottoms 3. However, as soon as the rotation of the sleeve 50 brings the other notch 72 up to the arm 69 the pressure of the spring 55 against the arms 67 serves to swing the member 65 in a clockwise direction as the arm 69 finds and enters the next notch. This, of course, disengages the clutch and stops the rotation of the shaft 24 and crank 28. As will be obvious, the reengagement of the arm 69 in the next slot locks the driven clutch sleeve 50 and shaft 24 against rotation in either direction.

If it should occur, however, in engaging the clutch that the teeth 46 come into driving engagement with the teeth 52 before the arm 69 is entirely out of the associated slot in the flange 56, which effectively prevents any rotation of the sleeve 50, the parts do not jam; instead, the inclined surfaces of the teeth 46 and 52 act merely to forcibly move the driven clutch sleeve 50 toward the left as viewed in Figure 3, the spring 91 yielding if the operator maintains a pull on the trip lever 77. In this connection it will be noted that the space 46a between the teeth 46 is appreciably wider than the teeth 52, and hence there is ample opportunity to move the clutch members into full engagement and simultaneously withdraw the arm 69 from its associated slot before the teeth 46 come into driving engagement with the teeth 52. However, as just described, if for any reason this does not occur, then the spring 91 yields and the clutch member 50 is momentarily but forcibly returned to its disengaged position. Then, if the operator has maintained his pull on the trip lever 77, as soon as the apices of the clutch teeth 46 pass the apices of the teeth 52, the pull on the lever 77 transmitted to the clutch 50 through the spring 91 and associated mechanism immediately forces the driven member 50 toward the right, as viewed in Figure 3, so that this time the arm 69 will be entirely out of its associated slot or spaced stops before the teeth 46 engage the teeth 52 and begin to drive the driven clutch sleeve 50.

While I have described the principles of my invention in connection with a plow, it is to be understood that the clutch mechanism of this invention can be embodied in other types of agricultural implements, and, as a matter of fact, is not limited to agricultural machines. It will be observed that the clutch mechanism is especially compact, is particularly well adapted for enclosing in the dust-proof oil retaining housing, whereby all parts may be adequately lubricated. It will also be noted that the parts are fewer in number and more rugged than those in a conventional half revolution clutch. In this connection, the clutch as disclosed is also a half revolution clutch, but it may be arranged to cycle at a full revolution, in which case only one stop slot would be provided, or any number of stops within one revolution of the driven part may be provided by having more slots in the flange 56 of the driven clutch sleeve 50. Where the clutch, as described, operates for half a revolution and then automatically stops, it will be seen that rotation of the ground wheel 25 in either direction will raise or lower the plow beams 2 and plow bottoms 3, depending upon which position the parts are in when the clutch is tripped. This is of especial importance in agricultural implements, such as plows and the like. Sometimes an implement of this character encounters an obstruction that prevents it from being moved forwardly. As an example, the plow bottom may come into contact with a large stone in the field. In that case, if the conventional half revolution clutch were used, it would be impossible to back the implement and at the same time raise the tools. This procedure is possible in the present construction for, as will be apparent from Figure 3, the engagement of a clutch will rotate the shaft positively in either direction, and as will be clear from Figure 1, rotation of the shaft in either direction will raise the beams 2 and plow bottoms 3.

It will also be seen from the above description that whether the tools are being raised or lowered, there is no possibility that the tools will move too rapidly, since there is no ratcheting of the parts, for the driven shaft 24 and crank 23 are locked to rotate with the ground wheel 25 in either direction. It was mentioned above that most conventional clutches race ahead when the implement is lowered, thereby allowing the tools to drop heavily upon the ground. This is not possible in the instant construction. It will also be seen that a pull on the trip lever 77 in one direction operates the clutch, whether the ground wheel is rotating in one direction or the other. Similarly, the efficiency of the present clutch is not impaired by wear of the parts nearly as much as is the case with the conventional clutch, because the clutch teeth of the present construction engage more positively than does the clutch roller in the conventional half revolution clutch.

It will therefore be understood that while I have shown and described above the preferred construction in which the principles of the present invention have been embodied, my invention is not to be limited to the specific details shown and described, but that, in fact, widely different means may be employed in the practice of the broader aspects of my invention.

What I claim, therefore, and desire to secure by Letters Patent is:

1. A self-interrupting clutch comprising driving and driven clutch members having clutch teeth formed so that movement of one member relative to the other causes said members to separate, said driven clutch member being biased for movement away from said driving clutch member so as to be normally out of driving engagement therewith, shiftable means engageable with said driven clutch member for normally holding the latter against movement, means for moving said shiftable means out of engagement with said driven clutch member and for moving the latter into engagement with said driving clutch member, said last means being yieldable to provide for automatic disengagement of said clutch by the relative movement between said members if driving engagement is established before said shiftable means releases the driven clutch member for movement with the driving clutch member.

2. A self-interrupting clutch comprising a driving clutch member, a driven member, a clutch sleeve slidable on the latter and engageable with said driving clutch member for driving said driven member, spring means normally holding said clutch member and said clutch sleeve out of driving engagement, one or more abutment sections carried by said driven clutch sleeve, and an operating lever having a part engageable with an abutment section for limiting the rotation of said clutch sleeve and another part engageable with the latter for shifting the same into driving engagement with said driving clutch member.

3. A self-interrupting clutch comprising a driving clutch member, a driven clutch member axially shiftable toward and away from said driving clutch member, a notched part on the peripheral portion of said driven clutch member, and a lever having a portion engageable with said driven clutch member for moving the latter into engagement with said driving clutch member and another portion engageable in a notch in said driven clutch member and movable out of said notch to permit rotation of the driven clutch member when the lever has moved the driven clutch member into engagement with the driving clutch member.

4. A clutch of the type set forth in claim 3 wherein said notched part on the driven clutch member acts against said lever to hold the latter in a position maintaining the driven clutch member in driving engagement with said driving clutch member until said portion reaches a notch in said driven clutch member.

5. A self-interrupting clutch construction for agricultural implements and the like comprising a housing, a driven shaft journaled therein, a driving clutch member supported on said shaft and including a part disposed in said housing and having axially facing clutch teeth, a driven clutch sleeve mounted for sliding movement on said shaft and disposed against said housing, said sleeve having clutch teeth facing the teeth on said driving clutch member and a flange having one or more notches formed therein, spring means acting against said clutch member and sleeve for maintaining them in disengaged position, a lever mounted for rocking movement in said housing and including one portion engageable with said clutch sleeve for sliding the same relative to the driven shaft into engagement with said driving clutch member and another part adapted to enter a recess in the flanged portion of said clutch sleeve, means for swinging said lever to force said clutch sleeve into driving engagement with said driving clutch member and withdrawing said other part of the lever from said notch, thereby permitting said clutch sleeve and said driven shaft to rotate, said other part of the lever riding on the flange portion of said clutch sleeve so as to cause the first mentioned part of the lever to maintain the clutch sleeve in driving engagement with said driving clutch member until said second mentioned part reaches and enters a notch in the flanged portion of said clutch sleeve.

6. A self-interrupting clutch comprising a driving clutch member having inclined teeth, a driven clutch member having inclined teeth and an axially facing peripheral section provided with one or more notches therein, a lever pivoted at an intermediate point for swinging movement having one portion engageable with said shiftable clutch member for moving the same into engagement with the driving clutch member and another part adapted to enter a notch in the peripheral portion of the driven clutch member to lock the latter against rotation, said lever being so constructed that when said one portion of the lever is in a position permitting disengagement of the clutch members the other portion of said lever enters a notch in the driven clutch member and locks the latter against rotation, spring means biasing said clutch members for relative movement into their disengaged position, yieldable operating means acting against said lever for swinging the same to shift said driven clutch member into engagement with said driving clutch member and simultaneously withdrawing said other part of the lever from the notch, said operating means yielding to permit the driven clutch member to be disengaged by the action of said inclined clutch teeth if driving engagement is effected between the clutch members before said lever part is withdrawn from its associated notch.

7. A self-interrupting clutch comprising driving and driven clutch members having clutch teeth, said driven clutch member having a notched peripheral flange, means biasing said clutch members to hold them in disengaged position, a pivoted lever acting against one of said clutch members to force it against said biasing means into engagement with the other clutch member, said lever having a part engageable in a notch in said flange to hold said driven clutch member against movement, means for swinging said lever to engage said clutch members and disengage said part from the driven clutch member to permit the latter to rotate, said lever part riding along the flange of said driven clutch member so as to hold the clutch members in driving relation against the action of said biasing means tending to separate them, said part being biased by said spring means acting through said driven clutch member against said other part of the lever for causing said one part to enter the notch next encountered so as to stop rotation of said driven clutch member and disengage said clutch members.

8. A self-interrupting clutch comprising an axially shiftable driven clutch member having spaced apart clutch teeth thereon and a notched flange, a driving clutch member having spaced apart clutch teeth facing said clutch teeth on the driven clutch member and the spacing between the driving clutch teeth being greater than the corresponding dimension of the driven clutch teeth whereby a limited amount of relative movement between the driving and driven clutch members is permissible after the clutch members are in a position for driving engagement, spring means biasing said clutch members for relative movement into disengaged position, and a pivotally mounted lever having one end formed to engage said shiftable clutch member for moving the latter into engagement with the driving clutch member and the other end formed to engage the notched flange of said driven clutch member for locking the latter against rotation, the spacing between said teeth providing for the full disengagement of said other end of said lever before the driving clutch member begins to drive said driven clutch member.

9. A self-interrupting clutch as set forth in claim 8 having the clutch teeth inclined, and yieldable means acting against said lever, whereby said last named means yields and said inclined clutch teeth force said driven clutch member into disengaged position if driving relation between the clutch members is established before said other end of the lever is disengaged from the notched flange of said driven clutch member.

10. A self-interrupting clutch comprising a driving clutch member, an axially shiftable clutch member, each of said clutch members having teeth for transmitting the drive, means biasing said driven clutch member for movement away from said driving clutch member, said driven clutch member having a notched periphery with the notches facing generally axially of the driven clutch member, and a control lever for the clutch mounted for movement about an axis adjacent said shiftable clutch member and generally radially inwardly of the notched periphery thereof, said control lever including parts swingable in opposite directions, one extending generally radially inwardly and adapted to engage and shift said driven clutch member and the other extending generally radially outwardly and adapted to enter a notch and hold said driven clutch member against rotation in either direction, and means for swinging said lever to carry said other part out of engagement with the associated notch and to cause said first part of the lever to move the shiftable clutch means against said biasing means into engagement with said driving clutch member.

11. A self-interrupting clutch comprising a driving clutch sleeve having axially facing clutch teeth, a driven clutch sleeve mounted coaxially with said driving clutch sleeve and having clutch teeth engageable with said driving clutch teeth, one of said sleeves being axially shiftable, biasing means for holding said clutch sleeves separated, a rock shaft, means carried thereby and engageable with said one clutch sleeve for forcing the same into engagement with the other clutch sleeve against the action of said biasing means, means serving as a pair of spaced apart stops carried by said driven clutch sleeve, and means carried by said rock shaft and disposable between said stops for limiting rotation of said driven clutch sleeve in either direction until the movement of said rock shaft has forced the clutch sleeve into full engagement with said driving clutch sleeve and has disengaged said last mentioned means from between said stops.

12. A self-interrupting power-lift clutch for agricultural implements and the like comprising a housing, a driven shaft journaled for rotation therein, a driving clutch sleeve journaled for rotation on said shaft and extending axially of the housing to a point exterior thereof, said driving clutch sleeve having a flanged section within said housing provided with axially facing clutch teeth, a driven clutch sleeve slidably but non-rotatably mounted on said driven shaft and having clutch teeth adapted to engage the driving clutch teeth, spring means normally separating said clutch sleeves, a transverse shaft journaled for rocking movement in said housing and having one end extending axially thereof, one or more pairs of spaced apart stops carried by said driven sleeve, an arm fixed to said rock shaft and normally disposable between the stops of each pair for holding said sleeve and said first mentioned shaft against rotation in either direction, a second arm also fixed to said rock shaft and engageable with said driven clutch sleeve, rocking movement of said shaft in one direction shifting said driven sleeve into engagement with said driving clutch sleeve and simultaneously withdrawing said first mentioned arm from between said stops, whereby said driven sleeve is free to rotate with said driving clutch sleeve when full engagement therewith is effected, said spring means acting against the driven clutch sleeve for pressing the latter against said arm means and causing said first arm to enter between the next pair of stops encountered by said first arm as said driven clutch sleeve is rotated.

13. A self-interrupting power lift clutch construction for an agricultural implement or the like, said clutch construction comprising a housing, a driven shaft journaled in said housing and extending outwardly of the housing at one end, a driving clutch sleeve journaled for rotation about the other end of said driven shaft and extending outwardly of the housing, a driven clutch sleeve slidably but non-rotatably mounted on said driven shaft and having clutch teeth adapted to engage the driving clutch teeth, spring means normally separating said clutch sleeves, a transverse shaft journaled for rocking movement in said housing and having one end extending axially thereof, one or more pairs of spaced apart stops carried by said driven sleeve, an arm fixed to said rock shaft and normally disposable between the stops of each pair for holding said sleeve and said first mentioned shaft against rotation in either direction, and a pair of arms also fixed to said rock shaft and engageable with said driven clutch sleeve generally at opposite sides of said driven shaft, rocking movement of said transverse shaft in one direction shifting said driven sleeve into engagement with said driving clutch sleeve and simultaneously withdrawing said first mentioned arm from between said stops, whereby said driven sleeve is free to rotate with said driving clutch sleeve when full engagement therewith is effected.

14. A self-interrupting power-lift clutch for agricultural implements and the like comprising a housing, a driven shaft journaled for rotation therein, a driving clutch sleeve journaled for rotation on said shaft and extending axially of the housing to a point exterior thereof, the inner part of said sleeve being flanged and reacting against said housing to prevent axially outward movement of said sleeve, driving clutch teeth carried by said flanged inner part of the driving clutch sleeve, a driven clutch sleeve slidably but non-rotatably mounted on said driven shaft and having clutch teeth adapted to engage the driving clutch teeth, spring means normally separating said clutch sleeves, and means carried by said housing and operable in one position to hold said driven clutch sleeve against rotation and operable in the other position to release said driven clutch member and force said driven clutch sleeve into engagement with said driving clutch sleeve against the bias of said spring means.

15. A self-interrupting clutch comprising axially shiftable driving and driven clutch members, each having a generally radially outwardly extending flange and clutch teeth disposed radially inwardly of the radially outer portions of said flange, said teeth extending generally axially, spring means disposed about said members generally radially outwardly of said clutch teeth and having opposite ends engaging, respectively, said radially outwardly extending flanges for holding said clutch members out of engagement, and means for moving said clutch members into engagement.

16. A self-interrupting clutch comprising a driving clutch member, a driven clutch member, said clutch members being generally axially shiftable and each having a generally radially outwardly extending flange and radially inwardly disposed generally axially facing clutch teeth, means disposed about said clutch members generally radially outwardly of said teeth and having opposite ends engaging, respectively, said radially outwardly extending flanges for biasing one of said clutch members for movement out of driving connection with the other clutch member, means engaging the flanged part of said driven clutch member for releasably holding the latter against movement, and means associated therewith for withdrawing said holding means and engageable with said one clutch member for moving it into driving connection with the other clutch member against the tension of said biasing means.

17. A self-interrupting clutch comprising driving and driven clutch members, one being mounted for axial movement toward and away from the other into and out of engagement therewith, means engageable with the shiftable clutch member for normally holding the latter against rotation, and means for moving said shiftable clutch member out of engagement with said engaging means and into engagement with the other clutch member, said clutch members having means whereby said clutch members are separated if driving engagement therebetween is established before said shiftable means releases said one clutch member for movement with the driving clutch member.

18. A self-interrupting clutch comprising driving and driven clutch members, the driven clutch member being movable generally axially toward and away from the driving clutch member into and out of engagement therewith, said driven clutch member having a notch in the periphery thereof, and a rockably mounted member having two arm means, one adapted to engage in said notch when the driven clutch member is out of engagement with the driving clutch member for holding the driven clutch member against rotation, the other arm means being engageable with said driven clutch member for moving the latter into driving engagement with the driving clutch member, said clutch members having means for disengaging said clutch members if the movement of said arm means should cause driving engagement to be established between said clutch members before said one arm means is shifted out of the notch on said driven clutch member.

19. A self-interrupting clutch comprising driving and driven clutch members having clutch teeth formed so that movement of one member relative to the other causes said members to separate, shiftable means engageable with said driven clutch member for normally holding the latter against rotation, and means for moving said shiftable means out of engagement with said driven clutch member and for moving the latter into engagement with said driving clutch member, said last means being yieldable to provide for automatic disengagement of said clutch by the relative movement between said members if driving engagement is established before said shiftable means releases the driven clutch member for movement with the driving clutch member.

20. Enclosed clutch mechanism for agricultural implements and other machines subjected to dusty and other adverse conditions, said enclosed clutch mechanism comprising an enclosing housing, driving and driven clutch members disposed therein in coaxial relation, said clutch members having clutch teeth adapted to be interengaged and one of said clutch members being movable axially toward and away from the other clutch member for bringing said clutch teeth into and out of engagement, spring means extending directly between said clutch members and disposed in a position radially of said clutch teeth, whereby said clutch members and said biasing spring form a compact unit disposed within said housing, transverse shaft means mounted for rocking movement in said casing and extending generally transversely of the axis of rotation of said clutch members and disposed relatively closely adjacent the peripheral portion of said shiftable clutch member, and means in said casing carried by said transverse shaft means for controlling the position of said axially shiftable clutch member.

21. Enclosed clutch mechanism for agricultural implements and other machines subjected to dusty and other adverse conditions, said enclosed clutch mechanism comprising an enclosing housing, driving and driven clutch members disposed therein in coaxial relation, said clutch members having clutch teeth adapted to be interengaged and one of said clutch members being movable axially toward and away from the other clutch member for bringing said clutch teeth into and out of engagement, spring means extending directly between said clutch members and disposed in a position radially of said clutch teeth, whereby said clutch members and said biasing spring form a compact unit disposed within said housing, transverse shaft means mounted for rocking movement in said casing and extending generally transversely of the axis of rotation of said clutch members and disposed relatively closely adjacent the peripheral portion of said shiftable clutch member, and means carried by said shaft means and extending generally radially inwardly at both sides of the axis of rotation of said clutch members and engageable with the shiftable clutch member for moving the latter against the bias of said spring into engagement with said driving clutch member.

22. Enclosed clutch mechanism for agricultural implements and other machines subjected to dusty and other adverse conditions, said enclosed clutch mechanism comprising an enclosing housing, driving and driven clutch members disposed therein in coaxial relation, said clutch members having clutch teeth adapted to be interengaged and one of said clutch members being movable axially toward and away from the other clutch member for bringing said clutch teeth into and out of engagement, spring means extending directly between said clutch members and disposed in a position radially of said clutch teeth, whereby said clutch members and said biasing spring form a compact unit disposed within said housing, transverse shaft means mounted for rocking movement in said casing and extending generally transversely of the axis of rotation of said clutch members and disposed relatively closely adjacent the peripheral portion of said shiftable clutch member, means extending generally radially inwardly from said shaft means and engageable with the shiftable clutch member for moving the latter against the bias of said spring into engagement with the driving clutch member, and cooperating means on the peripheral portion of said shiftable clutch member and on said shaft means extending generally from the axis of movement thereof toward the periphery of said shiftable clutch member for locking the latter against rotation until driving engagement between said clutch members is established.

23. Enclosed clutch mechanism for agricultural implements and other machines subjected to dusty and other adverse conditions, comprising an enclosing casing, a pair of axially disposed clutch members mounted for rotation in said casing, one being the driving clutch member and the other being the driven clutch member, the latter being shiftable toward and away from the driving clutch member, spring means disposed between the driving and driven clutch members and biasing the driven clutch member for movement away from the driving clutch member, such spring means being disposed about said clutch members in relatively closely spaced relation, a member disposed within said housing rockable about a transverse axis passing relatively close to the peripheral portion of said driven clutch member, said rockable member having one part engageable with the driven clutch member so that when the rockable member is rocked in one direction the shiftable clutch member is moved toward the driving clutch member, said rockable member having another part engageable with the periphery of said shiftable clutch member, the peripheral portion of the latter having a notch in which said other part of the rockable member is adapted to engage for holding the shiftable clutch member against rotation when it is disengaged from the driving clutch member, said driving and driven clutch members having teeth that have inclined faces whereby if driving engagement is established before said driven clutch member is released for rotation, said clutch teeth serve to force the driven clutch member out of engagement with the driving clutch member, and yielding means disposed outside said casing and connected with said rockable member for causing the latter to shift the shiftable clutch member toward the driving clutch member, said yielding means yielding to accommodate said teeth forcing the driven clutch member axially away from the driving clutch member if driving engagement between said clutch members is established before the driven clutch member is released for rotation.

24. Enclosed clutch mechanism for agricultural implements and other machines subjected to dusty and other adverse conditions, comprising an enclosing housing, a pair of driving and driven clutch members mounted in coaxial relation in said housing for rotation therein, said driven clutch member having a peripheral portion provided with a generally axially opening notch therein, a rockable member disposed within said casing adjacent said driven clutch member and mounted therein for rocking movement about a transverse axis extending closely adjacent to the peripheral portion of said driven clutch member, an arm on said rockable member adapted to engage in said notch for holding the driven clutch member against rotation, when the rockable transverse member is rocked in a direction to carry said arm into said notch, and means whereby rocking movement of said transverse member in the other direction establishes driving connection between said driving and driven clutch members and frees the driven clutch member for rotation by moving said arm out of said notch.

25. Clutch mechanism comprising a pair of clutch members, one of which is mounted for axially shifting movement toward and away from the other clutch member, said one clutch member having a notch formed therein, and a rockable controlling member mounted for rocking movement about a transverse axis adjacent said one clutch member and having a first portion adapted to seat in said notch to hold said one clutch member against rotation and another section engageable with said clutch member for shifting the same so as to carry said notch generally in a direction away from said first portion.

26. Clutch mechanism comprising a pair of clutch members, clutch teeth formed on said members and adapted to be engaged when driving connection is to be established through said clutch members, said clutch teeth being arranged so that the width of the space between teeth is substantially greater than the thickness of the tooth, whereby a limited amount of rotation of one clutch member relative to the other is accommodated when they are in their engaged positions, and means simultaneously engageable with the shiftable clutch member for holding the same against rotation and moving the same toward its engaged position, the permissible relative rotation between the clutch members when in engaged position normally accommodating the completion of the removal of said holding means from engagement with the shiftable clutch member after the shiftable clutch member has reached its engaged position.

27. In a clutch, an axially shiftable and rotatable clutch member having a peripheral portion formed with a notch therein, and a rockable controlling member mounted for movement about an axis disposed generally transverse with respect to the axis of rotation of said shiftable clutch member, said control member having a first part engageable in said notch and a second part engageable with said clutch member for moving the same axially while said first part is engaged in said notch.

28. In a clutch, a shaft, a clutch mounted on said shaft and shiftable axially, said clutch member having a peripheral section formed with a notch therein, a transversely disposed rockable member mounted for rocking movement about a transverse axis adjacent said peripheral section, a first arm on said rockable member engageable in said notch for holding the clutch member against rotation, and a pair of arms rigidly connected with said first arm and disposed in engagement with said clutch member on opposite sides of said shaft for shifting said clutch member axially.

29. A self-interrupting clutch comprising driving and driven clutch members, one being mounted for movement toward and away from the other into and out of engagement therewith, shiftable means engageable with the shiftable clutch member for normally holding the latter against movement in either direction, and means for moving said shiftable means out of engagement with said shiftable clutch member and for simultaneously moving the latter into engagement with the other clutch member, said driving and driven clutch members having teeth, each of which has its opposite faces formed to transmit force in either direction, each of the two faces of each clutch tooth being inclined whereby if driving engagement is established before said driven clutch member is released for rotation, said clutch teeth serve to force the driven clutch member out of engagement with the driving clutch member, whether said driving member is rotating in one direction or the other.

CARL G. STRANDLUND.